UNITED STATES PATENT OFFICE.

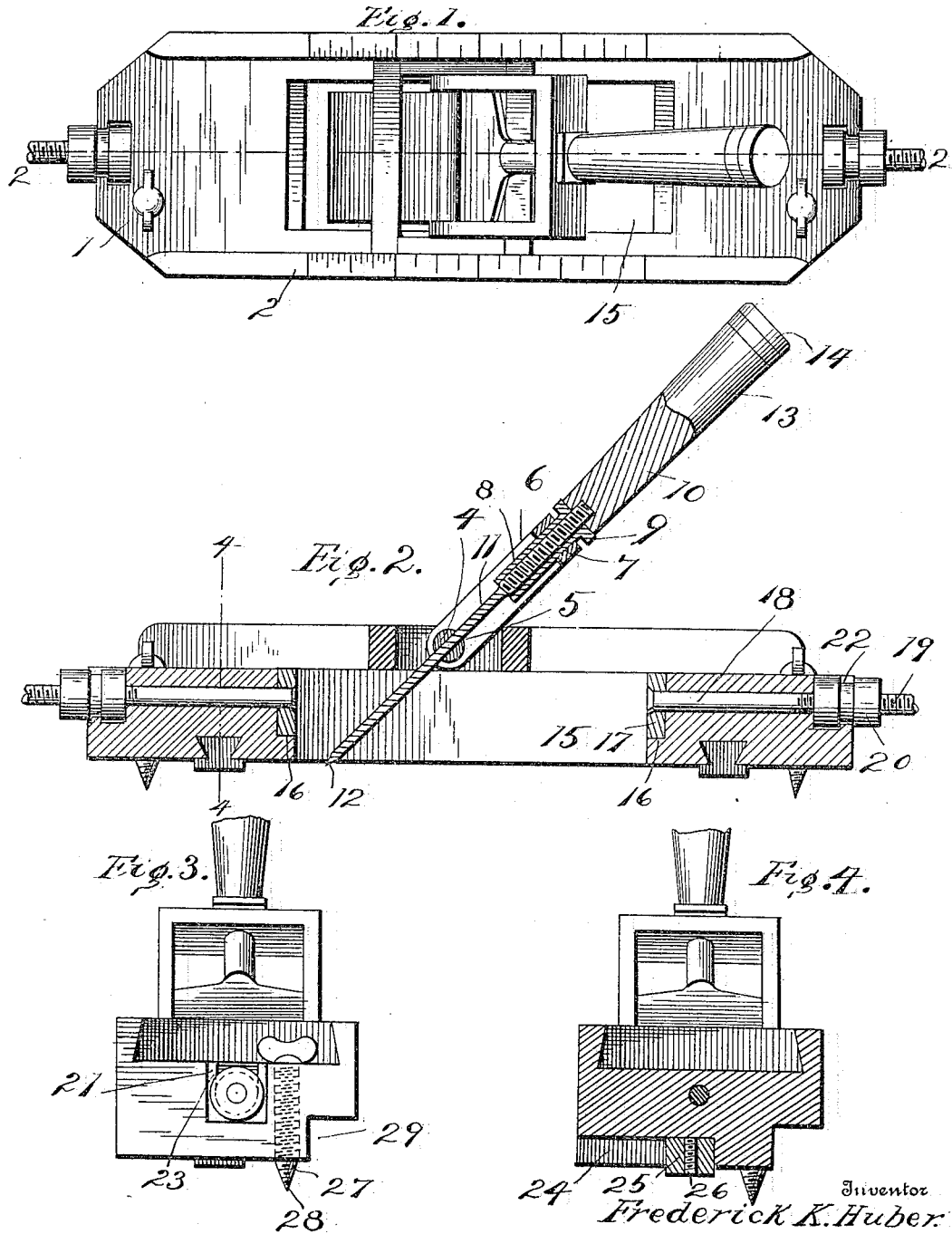

FREDERICK K. HUBER, OF CELINA, TEXAS.

MORTISING-TOOL.

No. 809,954. Specification of Letters Patent. Patented Jan. 16, 1906.

Application filed March 21, 1905. Serial No. 251,285.

*To all whom it may concern:*

Be it known that I, FREDERICK K. HUBER, a citizen of Switzerland, residing at Celina, in the county of Collin and State of Texas, have invented certain new and useful Improvements in Mortising-Tools; and I do hereby declare the following to be a full, clear, and exact description of the invention, such as will enable others skilled in the art to which it appertains to make and use the same.

My invention relates to mortising-tools; and it is more particularly a device for mortising door-frames so as to properly receive a hinge.

Where an ordinary chisel is employed for mortising a door-casing, it is found difficult to cut a recess which is of uniform depth and of proper proportions.

The object of the present invention is to provide a body having a carrier mounted therein so as to reciprocate, said carrier being limited in its movement by adjustable stop-plates adapted to be placed at suitable distances apart, whereby a cut of uniform length may be produced.

Another object is to provide a cutting-tool which is adjustably mounted within the carriage and has means for regulating the depth of the cut.

Another object is to provide means for securing the body to the door-casing during the cutting operation.

With the above and other objects in view the invention consists of a body having means for securing it to the door-casing, and this body has an elongated opening therein, in which is slidably mounted a carriage. A cutting-tool is slidably and pivotally mounted within the carriage and has means for limiting its longitudinal movement, whereby the depth of the mortise may be regulated. Stop devices are adjustably mounted within the opening for regulating the depth of the cut produced by the tool. These devices may be set a proper distance apart, such distance being indicated by scales formed upon the body.

The invention also consists of the further novel construction and combination of parts hereinafter clearly set forth and claimed.

In the accompanying drawings I have shown the preferred form of my invention.

In said drawings, Figure 1 is a plan view of the tool. Fig. 2 is a section on line 2 2 of Fig. 1. Fig. 3 is an end elevation of the tool, and Fig. 4 is a section on line 4 4 of Fig. 2.

Referring to the figures by numerals of reference, 1 is the body, of any suitable proportions and provided along opposite edges and upon its upper surface with flanges 2, having overhanging inner walls, which form a dovetailed groove or passage for the reception of a carriage 3. This carriage consists of a rectangular frame, the sides of which are beveled, so as to fit against the overhanging edges of flanges 2, and extending transversely across the center of the carriage is a rotatable rod 4, having a longitudinally-extending slot 5 therein. A yoke 6 is secured to opposite portions of the rod 4 and has a centrally-disposed aperture 7 therein adapted to receive sleeve 8, provided with an angular head 9. This sleeve is internally threaded and receives and engages a threaded stem 10, projecting from one end of a blade 11, which is slidably mounted within the slot 5 and has a cutting edge 12. A handle 13 engages the stem 10 and is adapted to screw against the head 9, and the free end of the handle is preferably formed with a multiplicity of disks 14, of leather or other suitable material, whereby the handle can be hit with a mallet or other tool without being injured thereby.

An elongated angular opening 15 is formed within the body 1 to receive the blade 11. Shoulders 16 are formed on the end walls of the opening 15, and normally mounted above each shoulder is a stop-plate 17. Each stop-plate is fixedly secured to one end of stem 18, which is slidably mounted within and extends longitudinally through one end of the body 1 and has its outer portion threaded, as shown at 19. This threaded portion is engaged by a rotatable thumb-nut 20, which fits within a recess 21 in the end of the body, and has an annular groove 22, which receives a bead 23, formed within the recess 21. Longitudinal movement of the nut 20 is therefore prevented, but by rotating the nut stem 18 and its stop-plate will be moved longitudinally and the rotation of the stop-plate will be prevented, because the ends thereof abut loosely upon the side walls of the opening 15. Dovetailed grooves 24 are formed in the bottom of the body 1, and in each of these is mounted a slide 25, which projects a short distance from the face of the body. A set-screw 26 extends through the slide and is adapted to press against the inner wall of the groove 24, and thereby wedge the slide in any position to which it may be adjusted. Thumb-screws 27 extend through the ends of the body 1 and are preferably provided with pointed ends 28. By rotating these thumb-screws the body can be quickly secured to the door-casing or other structure to be mortised. If desired, the bottom of the body can be cut away longitudinally along one edge, as shown at 29, to permit the tool to overlap the stop-strip ordinarily found upon door-casings. A scale graduated to indicate inches and fractions thereof is formed upon the flanges 2 upon opposite sides of the opening 15, and by means thereof the stroke of the carriage 3 can be adjusted to the proper length.

In using the tool herein described it is first necessary to mark upon the door-casing where one end of the mortise is to be produced. The body 1 is then placed upon the casing. It is first necessary, however, to adjust the slide 25 so that a mortise of proper width will be produced. These slides, as will of course be understood, overlap the edge of the casing. After the body has been placed in position the screws 27 are screwed into engagement with the casing, and the body is therefore fastened to it. The carriage 3 is then drawn longitudinally between the flanges 2, and the blade 11 is drawn upward in the slot 5 and placed at right angles to the body 1 and with its cutting edge on the mark on the casing. One of the stop-plates 17 is then adjusted inwardly so as to contact with the blade 11, and the other stop-plate is also adjusted until the distance between the two stop-plates, as indicated by the graduations on the flanges 2, is equal to the length of the mortise to be cut. The cutting-blade is then driven into the door-casing by hitting the handle with a mallet or other tool, and any desired number of these cuts can be produced at various points between the stop-plates. It will be understood that the depth of the cuts may be regulated by rotating the sleeve 8, so as to draw the stem 10 upward or force it downward through the yoke. The stem will of course be locked against further adjustment by turning the handle 13 against the head 9. After the desired number of incisions have been made in the casing the blade 11 can be inclined, as shown in the drawings, and forced backward and forward over the casing between the limits established by the plates 17. A mortise of uniform depth and of the proper width and length will therefore be produced, and the leaf of a hinge can be accurately placed therein. If it is desired to remove the blade 11 for the purpose of sharpening or replacing it, it is merely necessary to screw the handle and sleeve 8 from the stem 10. Said stem can then be drawn downward out of the opening 7 in the yoke and the blade rotated independently of the yoke. Said blade can then be drawn upward and removed from the slot 5. It will be seen that this tool is very simple and durable in construction and may be used to accurately cut mortises, thereby greatly facilitating the hanging of doors, shutters, &c.

In the foregoing description I have described the preferred form of my invention; but I do not wish to limit myself to the precise construction and combination of parts, as I am aware that modifications can be made therein without departing from the spirit or sacrificing the advantages, and I therefore reserve the right to make such changes as fairly fall within the scope of my invention.

Having thus described my invention, what I claim as new, and desire to secure by Letters Patent, is—

1. A device of the character described, comprising a body, and a longitudinally-movable, swinging cutting-tool slidably connected to the body.

2. A device of the character described, comprising a body, a longitudinally-movable, swinging cutting-tool slidably connected to the body, and means to limit the sliding movement of the tool.

3. A device of the character described, comprising a body, a longitudinally-movable, swinging cutting-tool slidably connected to the body, and means for adjustably limiting the sliding and longitudinal movement of the tool.

4. In a device of the character described, the combination of a body, of a carriage slidably mounted therein, a swinging, cutting device longitudinally movable within the carriage, and adjustable means for limiting the longitudinal movement of the cutting device.

5. In a device of the character described, the combination with a body, of a carriage movable thereon, a swinging, cutting device longitudinally movable within the carriage, adjustable means for limiting the longitudinal movement of the cutting device, and adjustable means for limiting the movement of the carriage.

6. In a device of the character described, the combination with a body, of a carriage movably mounted therein, a swinging member mounted upon the carriage, and a cutting device longitudinally movable within said member.

7. In a device of the character described, the combination with a body, of a carriage movably mounted therein, a swinging member mounted upon the carriage, a cutting device longitudinally movable within said member, and adjustable means for limiting the movement of the cutting device within the swinging member.

8. A device of the character described, comprising a body having an elongated opening therein, and adjustable stop devices within the opening, and a swinging cutting device longitudinally movable within the carriage.

9. A device of the character described, comprising a body having an elongated opening and adjustable stop devices within the opening; a carriage mounted upon the body, a yoke movably connected to the carriage, a cutting device longitudinally movable within the yoke and movable therewith, and means to limit the longitudinal movement of the cutting device within the yoke.

10. In a device of the character described, the combination with a body, guide devices adjustably connected thereto and means for securing the body to a structure, said body having an elongated opening therein; of a carriage mounted upon the body, a yoke movably connected to the carriage, a cutting device longitudinally movable within the yoke and movable therewith, and means to limit the longitudinal movement of the cutting device within the yoke.

In testimony whereof I have signed my name to this specification in the presence of two subscribing witnesses.

FREDERICK K. HUBER.

Witnesses:
JAMES M. DRAKE,
JOHN T. MILLER.